United States Patent [19]
Stroobants

[11] Patent Number: 5,826,365
[45] Date of Patent: Oct. 27, 1998

[54] PLANAR BOARD WITH TWO-WAY LINE RELEASE

[75] Inventor: Marvin J. Stroobants, Chilton, Wis.

[73] Assignee: Brothertown Harbor, Inc., Chilton, Wis.

[21] Appl. No.: 859,438

[22] Filed: May 20, 1997

[51] Int. Cl.⁶ .................................................. A01K 91/08
[52] U.S. Cl. .......................... 43/4.5; 43/43.12; 43/44.88; 43/44.95
[58] Field of Search .................................... 43/4.5, 43.12, 43/43.13, 44.87, 44.88, 44.95, 44.92, 97; 269/236

[56] References Cited

U.S. PATENT DOCUMENTS

| | | | |
|---|---|---|---|
| 3,067,539 | 12/1962 | Black | 43/44.92 |
| 3,181,266 | 5/1965 | Leufvenius | 43/43.13 |
| 3,818,624 | 6/1974 | Duffy | 43/43.13 |
| 4,028,840 | 6/1977 | Willie | 43/43.13 |
| 4,138,793 | 2/1979 | Kellie | 43/44.92 |
| 4,745,702 | 5/1988 | Koch | 43/43.13 |
| 4,920,689 | 5/1990 | Anderson | 43/43.13 |
| 5,156,508 | 10/1992 | Grisley | 269/236 |
| 5,548,919 | 8/1996 | Hicks | 43/43.13 |

*Primary Examiner*—Jack W. Lavinder
*Attorney, Agent, or Firm*—Donald Cayen

[57] ABSTRACT

A planar board has a cam that cooperates with two resilient plates to selectively open and close the plates. When the cam is rotated to a first position, the plates are open to enable placing a fishing line between them. Rotating the cam to a second position closes the plates to clamp the fishing line. The clamping force is adjustable. The planar board is pulled by a boat only by the fishing line. Upon a strike, the fishing line slips from between the plates, and the planar board is released from the fishing line to float away. The cam can be rotated to a third position to clamp the fishing line between the plates and to simultaneously form an enclosed space between the plates and a finger on the cam. Upon a strike, the fishing line slips from between the plates but is captured in the enclosed space. The planar board then remains retained to the fishing line and is pulled to the boat with the fish. The clamping force on the fishing line can be adjusted such that the fishing line does not slip from between the plates upon a fish strike.

20 Claims, 5 Drawing Sheets

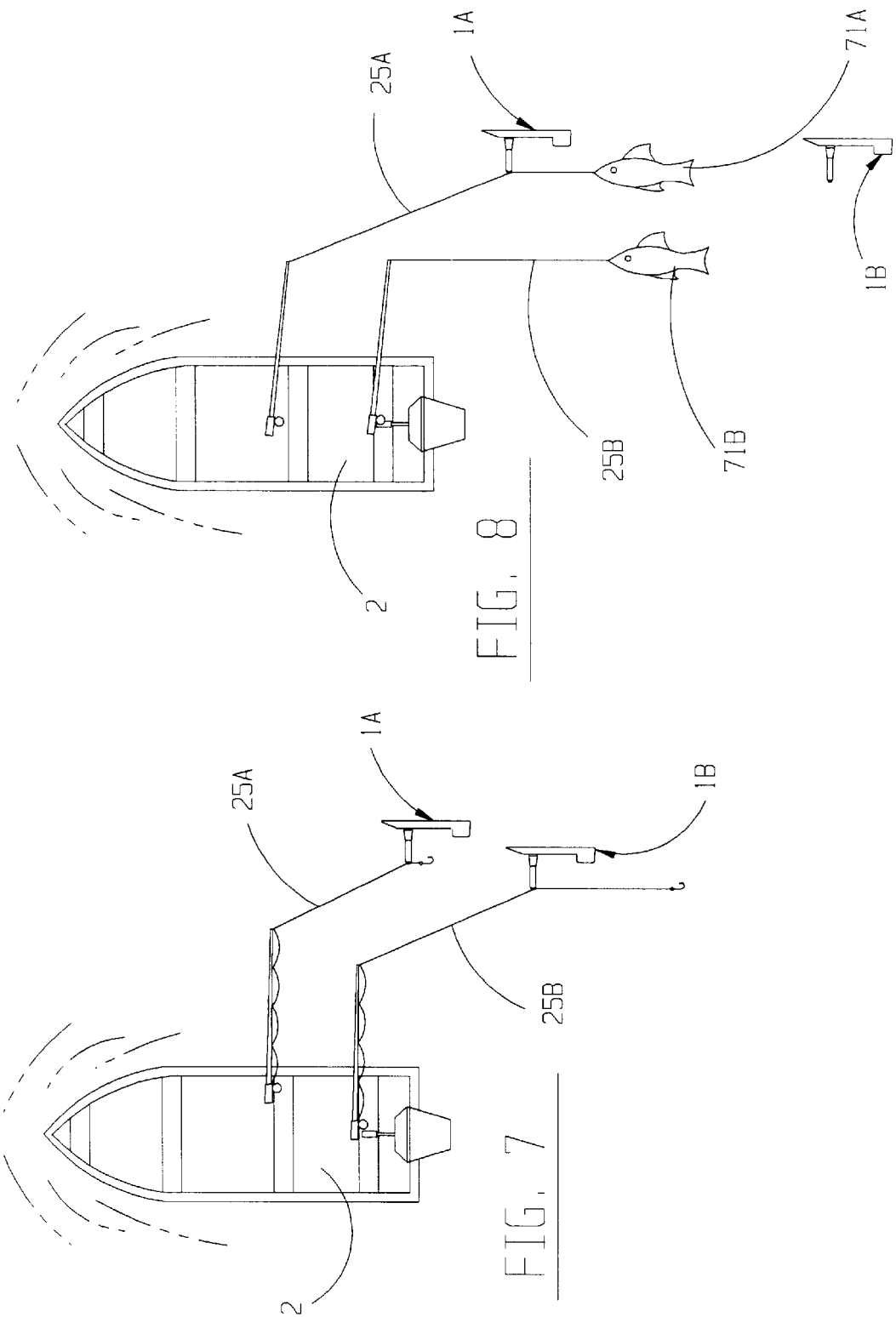

PLANAR BOARD WITH TWO-WAY LINE RELEASE

BACKGROUND OF THE INVENTION

This invention pertains to fishing equipment, and more particularly to apparatus for trolling fishing lines.

DESCRIPTION OF THE PRIOR ART

Various equipment has been developed to assist fishermen troll for fish. A particularly popular and useful trolling device is a planar board. Planar boards enable baits to be pulled through the water at locations away from the sides of the boat. The baits are therefore able to cover larger areas than just the strip the boat passes over. In addition, the planar boards locate the baits where the fish have been spooked by the boat passing overhead. The trolling speeds of the planar boards on the opposite sides of the boat vary when the boat turns, the inner planar board slowing in speed, and the outer planar board increasing in speed. Fish are often triggered to hit such varying speed baits. Planar boards have the additional advantages of not only allowing a fisherman to fish with more than one line on each side of the boat, but also of reducing the risk of line entanglement. Planar boards also work very effectively for fishing from stream and river banks, where the current will carry the board out into the stream or river, thereby allowing the fisherman to fish a greater area.

U.S. Pat. Nos. 3,949,512; 3,971,154; and 4,199,891 show planar boards in which the line from the fishing pole terminates at the planar board. A second line attached to the planar board carries the bait and fish hook. That design results in the planar board being pulled in with and the same amount as the fishing line every time a fish is hooked. In many instances, such an arrangement is awkward and undesirable.

U.S. Pat. No. 3,818,624 describes a planar board in which a first line is permanently attached between the planar board and the boat for towing the planar board. A separate fishing line is gripped by a tensioning device on the planar board. The tensioning device operates to release the fish line when a fish strikes such that the planar board floats free of the fish line, but the planar board remains attached to the towing line. A disadvantage of the design of the U.S. Pat. No. 3,818,624 patent is that two lines are required, thereby increasing the likelihood that the lines will become tangled.

U.S. Pat. No. 5,548,919 discloses a planar board that is towed with the fishing line. The fishing line is clamped in a spring loaded release. The fishing line is also secured to a small swivel clip. A fish strike pulls the line from the release, but the fishing line remains connected to the planar board by the clip. Removing the clip to release the planar board as the fish is reeled into the boat is a difficult and cumbersome task requiring two hands. The small clip size also makes it difficult and time consuming to set the planar board at the start of fishing. Further, the clip is almost impossible to manipulate by a fisherman wearing mittens in cold weather.

U.S. Pat. Nos. 4,698,933 and 5,163,246 show spring loaded fishing line releases. Those releases suffer the problem of being difficult to squeeze open, especially by children and elderly persons. Further, even new releases vary in clamping force. Their rubber pads have small areas that are under constant spring force, even when not in use. Accordingly, if the release is stored wet after use, the pads will bond together.

U.S. Pat. No. 4,745,702 teaches a planar board having different connections to a fishing line. In one variation, the line from the fishing pole connects to both a second line going to the bait and to a connector at the planar board. In another variation, a continuous fishing line is held by a rather complicated line stop that releases the line upon a strike.

The planar boards of U.S. Pat. Nos. 4,703,580 and 5,341,591 have no connection with a fishing line. Rather, the fishing lines are connected to separate lines that tow the planar boards from the boat. The separate fishing lines and towing lines increase the likelihood of line entanglement when a fish strikes.

Thus, a need exists for improvements in planar boards.

SUMMARY OF THE INVENTION

In accordance with the present invention, a planar board with a two-way line release is provided that easily enables a fisherman to selectively retain the planar board on or release it from a fishing line upon a strike. This is accomplished by apparatus that includes a three-position cam that is pre-set by the fisherman to produce the selected results.

The line release is comprised of a first plate made of a resilient material. The first plate has a first end that is secured to a low density block. The first plate terminates in a free end. A second resilient plate of the line release has a first end that is joined to the first plate. There is a pad on the free end of the second plate.

The line release is selectively set by the fisherman to an open or closed configuration. In the open configuration, the two plates are undeflected and make a small acute angle such that their free ends are spaced apart. The line release is placed in the closed configuration by bending the plate such that the pad on the second plate comes into contact with a rough textured surface near the free end of the first plate.

To control the bending of the line release plates and thereby place the line release in its open or closed configuration, the three-position cam is fastened for rotation to an adjustment screw. One end of the adjustment screw is held firmly in the first plate. The adjustment screw passes loosely through the second plate and terminates outside of that plate. The cam has three flats and a handle. When the cam is rotated by means of the handle to a first position such that a first flat is against the second plate, the first and second plates are undeflected and the line release is in its open configuration. When the cam is rotated to either of the other two positions, that is, either the cam second or third flat is against the top plate, the two plates are drawn toward each other such that the pad on the second plate firmly presses against the first plate. The length of the adjustment screw is variable to enable the clamping force between the pad and the first plate to be adjusted.

When the cam is in the second position, there is no obstruction between the free ends of the first and second plates and the pad. When the cam is in the third position, a finger on the cam enters a hole at the free end of the first plate. The cam finger cooperates with the pad and the two plates to form a small enclosed space.

In use, the fisherman opens the line release by flipping the cam handle such that the cam first flat is against the top plate. Flipping the cam handle requires the use of only one hand. The fisherman adjusts the length of the adjustment screw to produce the desired clamping force between the second plate pad and the first plate when the line release is closed. He places the fishing line at the desired point therealong against the pad. The adjustment screw serves as a convenient stop when placing the fishing line.

The fisherman then decides whether he wants the planar board to remain on the fishing line when a fish strikes, or whether the planar board should release from the fishing line. If he wants the planar board to release, he flips the cam handle to place the cam second flat against the second plate. He sets the adjustment screw for a moderate clamping force between the pad and the first plate. Upon a fish striking the bait, the fish line slips out from between the pad and the first plate. The planar board will float away and enable the fisherman to reel in the fish without any hindrance from the planar board. At a later time, the fisherman can retrieve the planar board.

On the other hand, if the fisherman desires the planar board to remain on the fishing line after a fish strikes, he has two choices. The first is to set the adjustment screw for a strong clamping force on the fishing line when the cam is in either its second or third position. When a fish strikes, the planar board stays in the same location on the fishing line. Alternately, the fisherman can set a moderate clamping force on the fishing line and flip the cam handle such that the cam third flat is against the second plate. The cam finger is then in the hole in the first plate. Upon a fish strike, the fishing line slips from between the pad and the first plate. However, the fishing line is captured in the space between the cam finger and the pad, thereby retaining the planar board on the fishing line. The planar board is, however, free to slide over the fishing line. With either choice, the fisherman merely flips the cam to its first position to open the line release to later release the planar board from the fishing line.

The method and apparatus of the invention, using resilient plates, thus enables a fisherman to selectively retain a planar board on or release it from a fishing line when a fish strikes. The cam is easily set to open and close the line release by using one hand and a simple flip of the cam handle, even though the cam can be set at three different positions.

Other advantages, benefits, and features of the present invention will become apparent to those skilled in the art upon reading the detailed description of the invention.

BRIEF DESCRIPTION OF THE DRAWINGS

FIG. 7 is a schematic view of two planar boards of the present invention in operation.

FIG. 8 is a view similar to FIG. 7, but showing the planar boards in operation after fish have struck their respective fishing lines.

DETAILED DESCRIPTION OF THE PREFERRED EMBODIMENT

Figure 1:
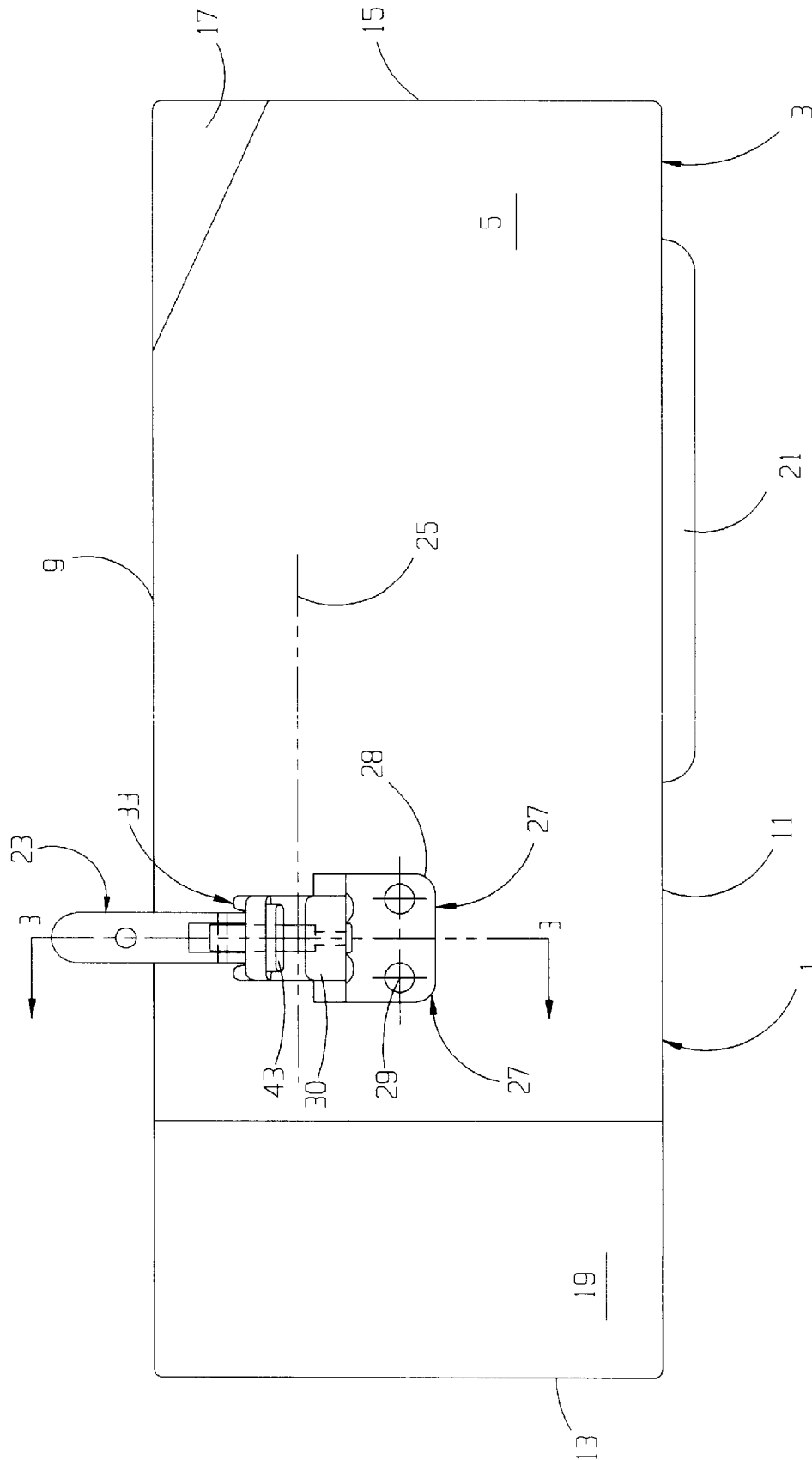
FIG. 1 is a front view of the planar board of the invention showing the line release in the open configuration.
Figure 2:
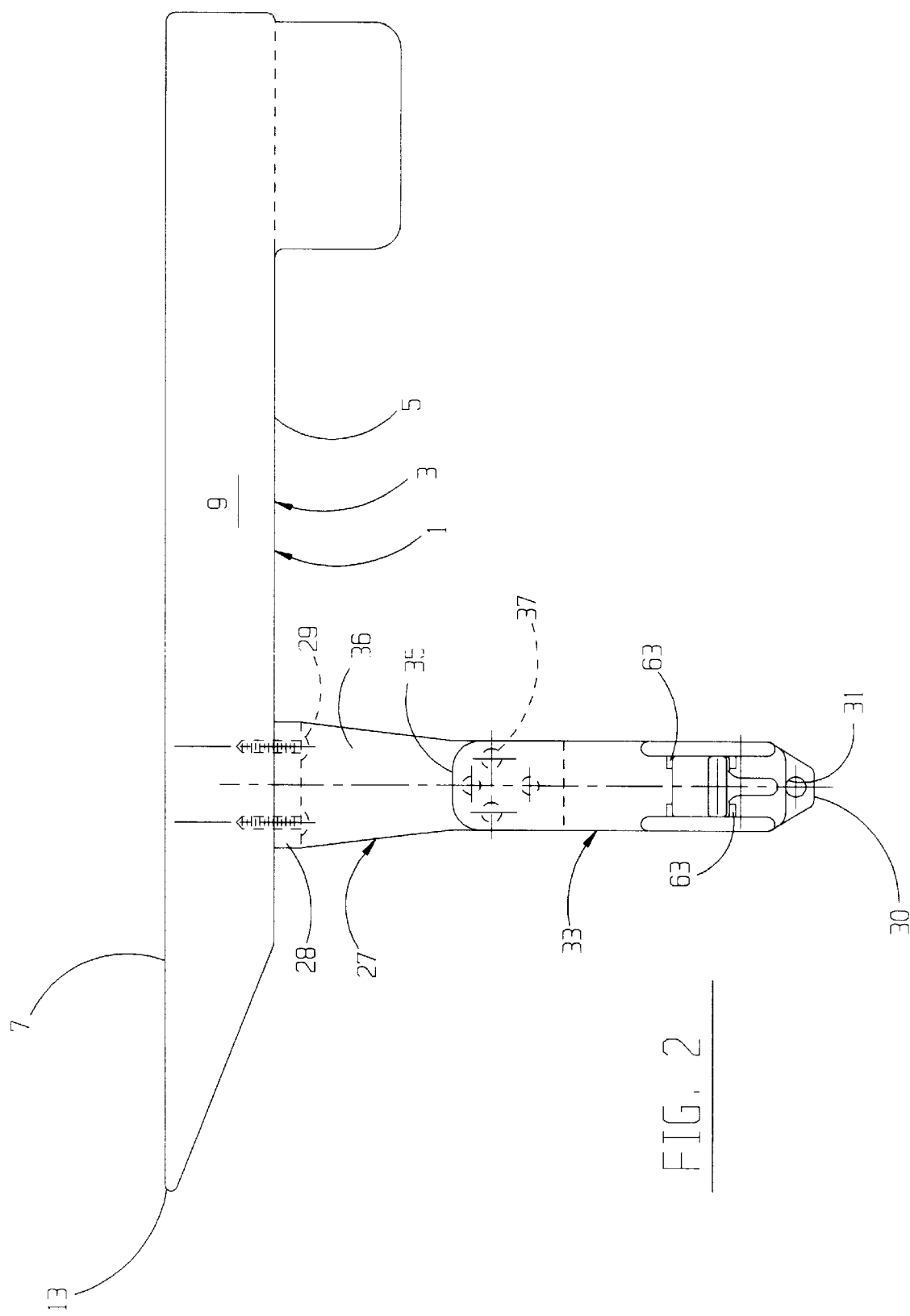
FIG. 2 is a top view of the planar board of the invention.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1–4, a planar board with two-way line release 1 is illustrated that includes the present invention. The planar board 1 is particularly useful for trolling a fishing line 25 from a moving boat 2 (FIG. 7). However, it will be understood that the invention is not limited to sports related applications.

The planar board with two-way line release 1 is comprised of a rectangular block 3 that is made of a low density material such that the block floats easily in water. Plastics and foam materials are two suitable materials for the block 3. The block has a first face 5, a second face 7, a top edge 9, a bottom edge 11, a front end 13, and a back end 15. A keel 17 protrudes from the block first face 5 at the junction of the top edge 9 and back end 15. The front end 13 of the block first face is tapered at reference numeral 19 toward the second face 7. A weight 21 is attached to the block along the bottom edge 11. The block may be right or left hand; the drawings show a right hand block.

In accordance with the present invention, a two-way line release 23 is mounted to the block 3. The line release 23 is designed to selectively open and close over the fishing line 25. Further, the line release enables the planar board 1 to be selectively released from or retained on the fishing line upon a fish strike. The line release can be used on both right and left hand blocks.

In the illustrated construction, the line release 23 comprises a first plate 27 having a first end 28 and a free end 30. The first end 28 of the first plate 27 is secured to the block first face 5 by fasteners 29. At the first plate free end 30 is a hole 31. There is a raised and rough textured surface 32 on the first plate top surface 36 near the free end. The first plate is made of a waterproof resilient plastic material.

Figure 3:
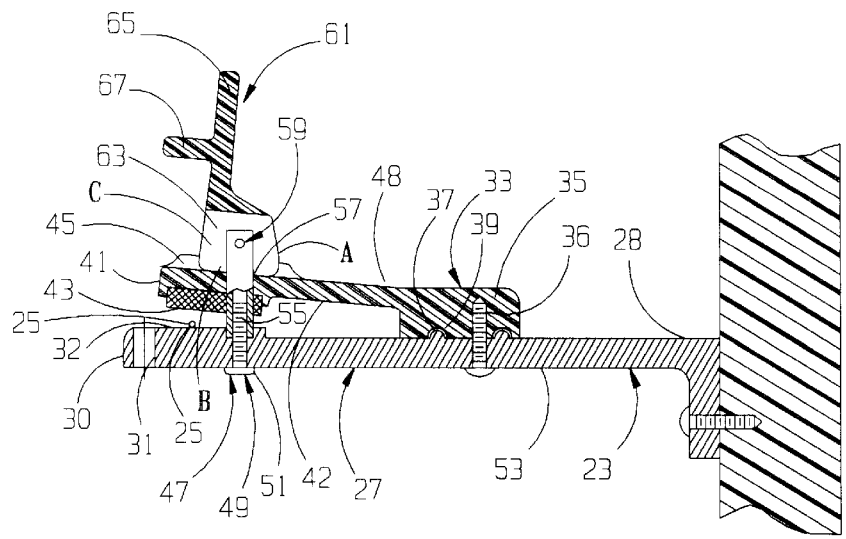
FIG. 3 is a cross sectional view on an enlarged scale taken along line 3—3 of FIG. 1.

A second plate 33 is made of the same material as the first plate 27. The second plate 33 has a first end 35 joined to the top surface 36 of the first plate approximately midway between the first plate first end 28 and its free end 30. The second plate may be located on the first plate by means of small knobs 37 in the first plate top surface 36 that fit into suitable holes 39 in the second plate. The two plates are designed such that under normal conditions they make an angle of approximately 5 degrees to 10 degrees with each other, as is best shown in FIG. 3. In that situation, the line release 23 is in an open configuration. The free end 41 of the second plate does not overlie the hole 31 in the first plate. Bonded in a shallow bore in a bottom surface 42 of the second plate is a pad 43 made of a compressible resilient material. The pad 43 has a greater area than prior planar board releases. The pad may be bonded to the second plate by a self-adhesive on the pad. A pair of spaced ribs 45 extend along the second plate top surface 48 near its free end 41.

The line release 23 further comprises a two-piece adjustment screw 47. The first piece 49 of the adjustment screw 47 is firmly held in the first plate 27. The adjustment screw first piece 49 has a threaded shank 55 that passes through the first plate. The adjustment screw second piece 57 is a threaded sleeve that engages the threaded shank 55 of the first piece. The end of the second piece 57 opposite the first piece has a cross hole that receives a pin 59.

To operate the line release 23, a three-position cam 61 is rotatably fastened to the adjustment screw 47 by the pin 59. The particular cam 61 illustrated is fabricated with a pair of walls 63 that straddle the adjustment screw. The pin passes through the cam walls 63. The cam further has a handle 65. The cam walls define three flats A, B, and C. The flats A and C are equidistant from the pin 59. The flat B is closer to the pin than are the flats A and C. A finger 67 extends from the handle 65 perpendicular to the flat C.

In FIG. 3, the cam 61 is shown in its first position. The cam flat B is then in contact with the top surface 48 of the second plate 33. The distance between the cam flat B and the pin 59 is such that the two plates 27 and 33 are in a relaxed state and make an angle of approximately 7 degrees with each other. The line release 23 is then in an open configuration. A fisherman can place the fishing line 25 between the pad 43 and the textured surface 32 of the first plate. The adjustment screw 47 serves as an entry stop for the fishing line.

Figure 5:
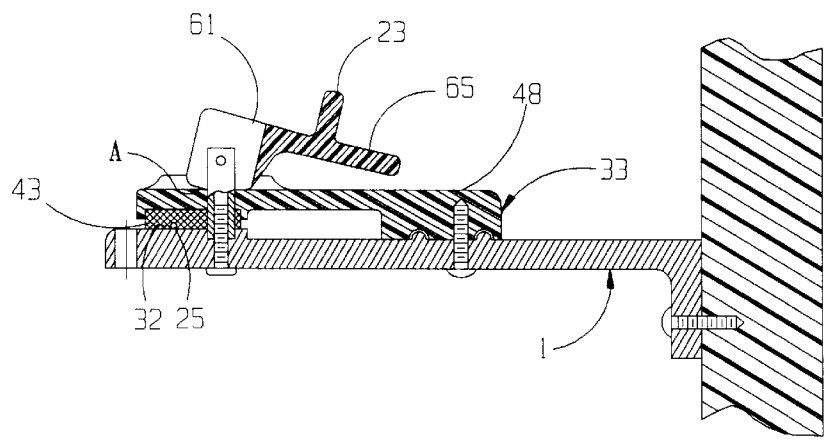
FIG. 5 is a view similar to FIG. 3, but showing the line release in the closed configuration and the cam in the second position thereof.

FIG. 5 shows the cam 61 in its second position. The second position is attained by rotating the cam by means of its handle 65 clockwise with respect to FIGS. 3 and 5 until the cam flat A contacts the surface 48 of the second plate 33. In that situation, the cam bends the two plates to make contact between the pad 43 and the surface 32 of the first plate 27. The line release 23 is then in a closed configuration. The fishing line 25 is then clamped in place between the pad and the first plate surface 32. The amount of clamping force on the fishing line is adjustable by adjusting the sleeve 57 of the adjustment screw 47 on the threads of the adjustment screw first piece 49. It will be recognized from FIG. 5 that if the fishing line slips from between the pad and the first plate, the entire planar board 1 becomes completely free of the fishing line.

Figure 6:
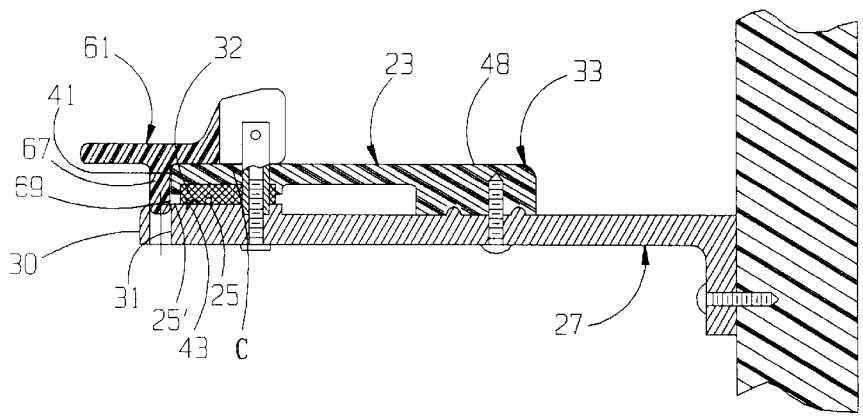
FIG. 6 view similar to FIG. 3, but showing the line release in the closed configuration and the cam in the third position thereof.
Figure 4:
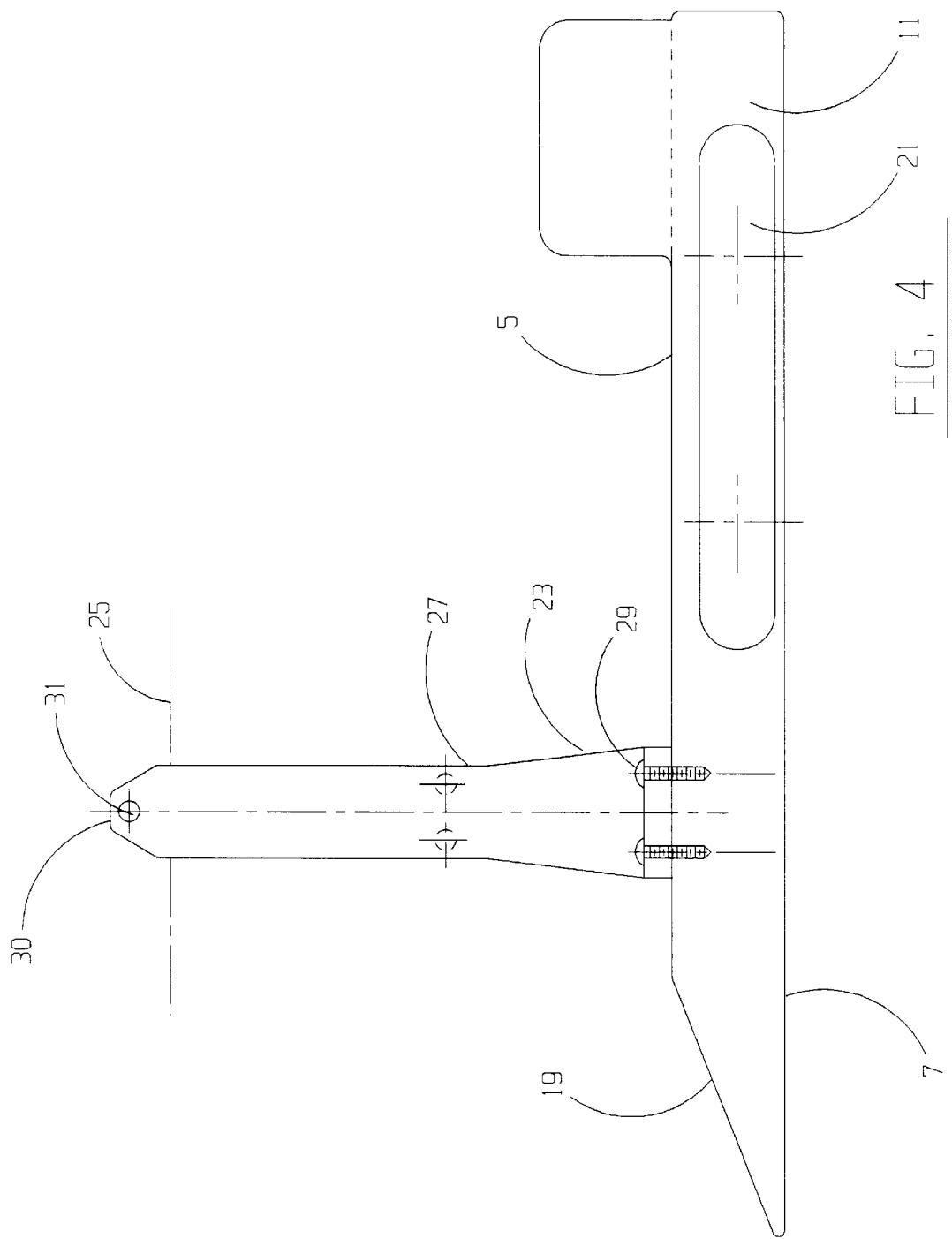
FIG. 4 is a bottom view of FIG. 1.

Now turning to FIG. 6, the cam 61 is shown in its third position. In that situation, the cam flat C is in contact with the top surface 48 of the second plate 33. In the third position, as in the second position, the cam bends the two plates to close the line release 23 by forcing the pad 43 against the surface 32 of the first plate 27. When the cam is in its third position, the cam finger 67 enters the hole 31 in the first plate. The finger cooperates with the pad and the free ends 30 and 41 of the first and second plates, respectively, to form a small enclosed space 69. If the fishing line 25 slips from between the pad and the first plate, it will enter the space 69 as is shown at reference numeral 25'. In that situation, the planar board 1 is retained to the fishing line, although the planar board is free to slide along the fishing line.

FIG. 7 represents two fishing lines 25A and 25B in use with respective planar boards 1A and 1B. The cam of the planar board 1A has been set by the fisherman to the cam third position of FIG. 6. The cam of the planar board 1B has been set to the cam second position of FIG. 5. The adjustment screws 47 of both planar boards have been set to exert moderate clamping forces on the respective fishing lines 25A and 25B. The planar boards control the locations of their respective fishing lines relative to the boat 2 in known manner.

When a fish 71A strikes the fishing line 25A, FIG. 8, the fishing line slips from between the pad 43 and the first plate surface 32 (FIG. 6). However, the fishing line remains in the space 69 of the line release 23. Consequently, the planar board 1A remains retained to the fishing line, but the planar board can slide along the fishing line. The fisherman reels in the fish 71A until it and the planar board 1A reach the boat 2. Then a quick flip of the cam handle 65 to the cam first position of FIG. 3 opens the line release 23 and releases the planar board from the fishing line. The planar board can be easily released using one hand, even in cold weather and when the fisherman is wearing mittens.

When a fish 71B strikes the fishing line 25B, the fishing line slips from between the pad 43 and the first plate surface 32 (FIG. 5). When that occurs, the planar board 1B is completely released from the fishing line 25B and is free to float away. The fisherman can reel in his fish 71B without any hindrance from the planar board 1B. Later, when the fish is safely in the boat 2, the fisherman can drive to the planar board 1B and retrieve it. That puts the fisherman back to where the fish are.

Although not illustrated, the adjustment screw 47 can be adjusted to produce a strong clamping force on the fishing line 25. In that case, the cam 61 may be set to either its second or third position. A fish strike then does not slip the fishing line from between the pad 43 and the textured surface 32. The planar board 1 stays in the same location on the fishing line and is reeled in with the fish. Upon reaching the boat, the cam is flipped to its first position to release the fishing line.

When the fisherman is through fishing for the day, he sets the cams 61 of his planar boards 1 in their first positions. The line releases 23 assume the open configuration of FIG. 3 such that the plates 27 and 33 do not acquire a permanent set. Further, the pads 43 are separated from the first plate surfaces 32, so the pads do not bond to the first plates during storage. If necessary, the pads are easily replaced by removing the two screws 37 and the self-adhesive on the pad.

In summary, the results and advantages of trolling for fish can now be more fully realized. The line release 23 provides the ability of either retaining the planar board 1 to or releasing it from the fishing line 25 when a fish strikes. This desirable result comes from using the combined functions of the cam 61. The cam is settable to a first position whereat the line release is open to enable the fishing line 25 to be placed or removed from between the pad 43 and the first plate 27. When the cam is set at its second position, the line release is closed to clamp the fishing line between the pad and the first plate. The clamping force is adjustable by means of the adjustment screw 47. A strike by a fish slips the fishing line from between the pad and the first plate, and the planar board floats free from the fishing line. In the third cam position, the line release is also closed. A fish strike slips the fishing line from between the pad and the first plate, but the planar board remains retained to and slidable along the fishing line. The adjustment screw can be adjusted to provide a strong clamping force on the fish line. The cam can then be set to either its second or third position, and the fishing line will not slip from between the pad and the first plate. Rotating the cam to any of its three positions is very easily accomplished with one hand merely by flipping a handle that is part of the cam.

It will also be recognized that in addition to the superior performance of the planar board with two-way line release 1, its construction is such as to cost little if any more than traditional line releases. Also, since the invention is of a simple design that separates the pad 43 from the first plate 27 during storage, the need for maintenance is minimal.

Thus, it is apparent that there has been provided, in accordance with the invention, a planar board with two-way line release that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method of trolling for fish comprising the steps of:
   a. securing a first end of a first resilient plate to a planar board, and immovably joining a first end of a second resilient plate to first plate, b. rotating a cam to a first position and opening the plates;

c. placing the fishing line between the plates;

d. rotating the cam to a second position and closing the plates to clamp the fishing line therebetween;

e. placing the planar board and fishing line in the water; and f. pulling the planar board from a boat solely by the fishing line.

2. A planar board with two-way line release comprising:

a. a block floatable on water; and b. release means for selectively clamping and releasing a fishing line comprising:

i. a first plate having a first end secured to the block and a free end;

ii. a second plate having a first end immovably joined to the first plate between the first and free ends thereof; and iii. cam means for coacting with the first and second plates to selectively open the release means to enable placing the fishing line between the first and second plates, and to close the release means by bending the first and second plates to clamp the fishing line with a predetermined force between the first and second plates.

3. The planar board of claim 2 wherein the cam means comprises a cam that is rotatable to a first position whereat the cam coacts with the first and second plates to open the release means, and to a second position whereat the cam coacts with the first and second plates to bend the first and second plates to close the release means.

4. The planar board of claim 3 wherein the cam is further rotatable to a third position whereat the cam coacts with the first and second plates to close the release means.

5. The planar board of claim 4 wherein:

a. the cam means comprises adjustment means for adjusting the clamp force on the fishing line between the first and second plates;

b. the adjustment means is adjustable to enable the fishing line to slip from between the first and second plates and the planar board is released from the fishing line in response to a strike on the fishing line when the cam is rotated to the second position thereof;

c. the adjustment means is adjustable to enable the fishing line to slip from between the first and second plates and the planar board is retained on the fishing line in response to a strike on the fishing line when the cam is rotated to the third position thereof; and d. the adjustment means is adjustable to prevent the fishing line from slipping from between the first and second plates and the planar board is retained on the fishing line in response to a fish strike on the fishing line when the cam is rotated to the second or third position thereof.

6. The planar board of claim 2 wherein the first and second plates make an angle of approximately 5 degrees to 10 degrees with each other when the cam means coacts with the first and second plates to open the release means.

7. A planar board with two-way line release comprising:

a. a block floatable on water; and b. release means for selectively clamping and releasing a fishing line comprising:

i. a first plate secured to the block;

ii. a second plate joined to the first plate; and iii. cam means for coacting with the first and second plates to selectively open the release means to enable placing the fishing line between the first and second plates, and to close the release means to clamp the fishing line with a predetermined force between the first and second plates, wherein the cam means comprises a cam that is rotatable to a first position whereat the cam coacts with the first and second plates to open the release means, and to a second position whereat the cam coacts with the first and second plates to close the release means, wherein the cam is further rotatable to a third position whereat the cam coacts with the first and second plates to close the release means, and wherein:

the first plate defines a hole; and the cam has a finger that enters the hole in the first plate when the cam is rotated to the third position thereof.

8. The planar board of claim 7 wherein:

a. the cam finger and the first and second plates cooperate to form an enclosed space when the cam is rotated to the third position thereof; and b. the adjustment means is adjustable to enable the fishing line to slip from between the first and second plates and the fishing line is captured within the enclosed space in response to a strike on the fishing line when the cam is rotated to the third position thereof.

9. Apparatus for trolling for fish comprising:

a. a fishing line pulled by a boat; and b. a planar board that controls the location of the fishing line relative to the boat comprising:

i. a block that floats on the water;

ii. a first plate having a first end secured to the block and a free end;

iii. a second plate having a first end immovably joined to the first plate between the first and second ends thereof; and iv. cam means for selectively controlling the plates to an open configuration whereat the fishing line is placeable between the plates, and to a closed configuration whereat the fishing line is clamped between the plates wherein:

a. at least the second plate is made of a resilient material that bends relative to the first plate when the plates are in the closed configuration; and b. the second plate defines a shallow bore; and c. the second plate comprises a resilient pad bonded in the second plate bore, the pad separating from the first plate when the plates are in the open configuration and pressing against the first plate when the plates are in the closed configuration to thereby clamp the fishing line placed between the pad and the first plate.

10. The apparatus of claim 9 wherein the cam means comprises:

a. adjustment means held to a selective one of the plates for passing loosely through the other plate; and b. a cam rotatably fastened to the adjustment means, the cam being selectively rotatable to a first position whereat the plates are in the open configuration and to a second position whereat the plates are in the closed configuration, and wherein the cam is rotatable to a third position whereat the plates are in the closed configuration.

11. The apparatus of claim 10 wherein:

a. the fishing line slips from between the pad means and the first plate in response to a strike on the fishing line when the plates are in the closed configuration;

b. the apparatus releases from the fishing line when the fishing line slips from between the pad means and the first plate and the cam is in the second position thereof; and c. the apparatus is retained on the fishing line when the fishing line slips from between the pad means and the first plate when the cam is in the third position thereof.

12. Apparatus for trolling for fish comprising:

a. a fishing line pulled by a boat; and b. a planar board that controls the location of the fishing line relative to the boat comprising:

i. a block that floats on the water;

ii. a first plate secured to the block;

iii. a second plate joined to the first plate; and iv. cam means for selectively controlling the plates to an open configuration whereat the fishing line is placeable between the plates, and to a closed configuration whereat the fishing line is clamped between the plates, wherein:

at least the second plate is made of a resilient material; and the second plate comprises pad means for separating from the first plate when the plates are in the open configuration and for pressing against the first plate when the plates are in the closed configuration to thereby clamp the fishing line plates between the pad means and the first plate, wherein the cam means comprises:

adjustment means held to a selective one of the plates for passing loosely through the other plate; and a cam rotatable fastened to the adjustment means, the cam being selectively rotatable to a first position whereat the plates are in the open configuration and to a second position whereat the plates are in the closed configuration, wherein the adjustment means is adjustable to vary the force with which the pad means presses against the first plate when the cam is rotated to the second position thereof, wherein the cam is rotatable to a third position whereat the plates are in the closed configuration, and wherein the cam comprises finger means for cooperating with the first and second plates to form an enclosed space that captures the fishing line when the cam is in the third position thereof and the fishing line slips from between the pad means and the first plate in response to a strike on the fishing line.

13. A method of trolling for fish comprising the steps of:

a. providing a planar board having a pair of resilient plates;

b. rotating a cam to a first position and opening the plates;

c. placing the fishing line between the plates;

d. rotating the cam to a second position and closing the plates to clamp the fishing line therebetween;

e. placing the planar board and fishing line in the water;

f. pulling the planar board from a boat solely by the fishing line;

g. slipping the fishing line from between the plates in response to a strike on the fishing line; and h. releasing the planar board from the fishing line and thereby enabling the planar board to float free from the boat.

14. A method of trolling for fish comprising the steps of:

a. providing a planar board having a pair of resilient plates;

b. rotating a cam to a first position and opening the plates;

c. placing the fishing line between the plates;

d. rotating the cam to a second position and closing the plates to clamp the fishing line therebetween and simultaneously forming an enclosed space on the planar board;

e. placing the planar board and the fishing line in the water;

f. pulling the planar board from a boat solely by the fishing line;

g. slipping the fishing line from between the plates in response to a strike on the fishing line; and h. capturing the fishing line in the enclosed space and thereby retaining the planar board on the fishing line.

15. The method of claim 14 comprising the further steps of:

a. reeling the fishing line and the planar board to the boat;

b. rotating the cam to the first position thereof; and c. removing the fishing line from between the plates.

16. The method of claim 14 wherein the steps of forming an enclosed space comprises the steps of:

a. providing a finger on the cam; and b. receiving the finger in a hole in a selected plate when the cam is rotated to the second position thereof, the finger cooperating with the plate to form the enclosed space.

17. In combination with a continuous fishing line having a first end pulled by a boar and a second end with a bait thereon, a planar board that controls the location of the bait in the water comprising:

a. a block that floats on the water; and b. release means secured to the block for releasably clamping the fishing line at a selected point therealong to pull the planar board throught the water solely by the clamping of the fishing line by the release means, wherein the release means comprises:

first and second plates having respective surfaces that releasably clamp the fishing line therebetween; and cam means for coacting with the plates to releasably clamp the fishing line between the plates, wherein the cam means comprises:

a screw held in a selected one of the plates and passing loosely throught the plate other than the selected one of the plates; and a cam having a finger means for cooperating with the first and second plates to form an enclosed space; wherein the cam is fastened to the screw for rotating between a first position whereat the cam coacts with the first and second plates to place the plates in an open configuration to enable placing the fishing line between the plates, and a second position whereat the cam coacts with the plates to place the plates in a closed configuration to clamp the fishing line between the plates; and wherein the cam is rotatable to a third position whereat the cam coacts with the first and second plates to place the plates in the closed configuration.

18. The combination of claim 17 wherein after the cam is rotated to the second position thereof to clamp the fishing line between the first and second plates the fishing line slips from between the plates in response to a fish strike on the bait, and the planar board is released from the fishing line and floats freely away from the boat.

19. The combination of claim 17 wherein after the cam is rotated to the third position thereof to clamp the fishing line between the first and second plates the fishing line slips from between the plates in response to a fish strike on the bait, and the planar board is retained on and slides along the fishing line.

20. The combination of claim 17 wherein after the cam is rotated to either the second or third position thereof to clamp the fishing line between the first and second plates, the fishing line remains clamped between the plates in response to a fish strike on the bait, and the planar board is retained on and remains in the same location on the fishing line.

* * * * *